US008664574B2

(12) United States Patent
Senn et al.

(10) Patent No.: US 8,664,574 B2
(45) Date of Patent: Mar. 4, 2014

(54) RESONATOR UNIT, EXPANSION PROCESS AND APPARATUS FOR HEATING CONTAINERS

(75) Inventors: Konrad Senn, Regensburg (DE); Andreas Apelsmeier, Regensburg (DE); Johann Zimmerer, Bernhardswald (DE); Guenther Winkler, Zell (DE)

(73) Assignee: Krones AG (DE)

( * ) Notice: Subject to any disclaimer, the term of this patent is extended or adjusted under 35 U.S.C. 154(b) by 555 days.

(21) Appl. No.: 12/686,858

(22) Filed: Jan. 13, 2010

(65) Prior Publication Data

US 2010/0181309 A1    Jul. 22, 2010

(30) Foreign Application Priority Data

Jan. 16, 2009    (DE) .......................... 10 2009 005 358

(51) Int. Cl.
*H05B 6/64*    (2006.01)

(52) U.S. Cl.
USPC ......................................................... 219/756

(58) Field of Classification Search
USPC ......................................................... 219/756
See application file for complete search history.

(56) References Cited

U.S. PATENT DOCUMENTS

| 3,553,413 | A | 1/1971 | Soulier | 219/10.55 |
| 4,275,283 | A | 6/1981 | Focht | 219/10.55 F |
| 5,986,249 | A | 11/1999 | Yoshino et al. | 219/746 |
| 5,998,775 | A | 12/1999 | Sung | 219/751 |
| 7,022,954 | B2 | 4/2006 | Behnke et al. | 219/693 |
| 7,034,266 | B1 | 4/2006 | DeGroot et al. | 219/700 |
| 2004/0226942 | A1 | 11/2004 | Behnke et al. | 219/702 |
| 2006/0065992 | A1* | 3/2006 | Hutchinson et al. | 264/45.1 |
| 2010/0052224 | A1 | 3/2010 | Humele et al. | 264/489 |

FOREIGN PATENT DOCUMENTS

| DE | 1915342 | 10/1969 | ............. B29C 35/10 |
| DE | 2846610 | 5/1980 | ............. B29C 35/10 |
| DE | 3819711 | 12/1989 | |
| DE | 69534104 | 3/2006 | |
| DE | 10 2006 015 475 | 10/2006 | ............. B29C 49/64 |
| DE | 10 2007 022 386 | 11/2007 | ............. B29C 49/64 |
| EP | 1411397 | 4/2004 | |
| JP | 63127025 | 11/1986 | ............... F24C 7/02 |
| WO | WO2007/131701 | 11/2007 | ............. B29C 49/64 |
| WO | WO2008/133810 | 11/2008 | ............... H05B 6/70 |

OTHER PUBLICATIONS

German Search Report, dated Sep. 29, 2011 (10 pgs).
Tse V. Chow Ting Chan, Howard C. Reader, "Understanding Microwave Heating Cavities," published Jun. 2006, book description only (3 pgs).

* cited by examiner

*Primary Examiner* — Matthew Reames
*Assistant Examiner* — Nicholas J Choi
(74) *Attorney, Agent, or Firm* — Hayes Soloway P.C.

(57) ABSTRACT

A resonator unit includes a resonator chamber with a first opening for receiving container in a predefined position and for heating the container with microwaves coupled into the resonator chamber. The chamber has a second opening via which the microwaves are coupled into the resonator chamber, wherein the geometry of the resonator chamber relative to the predefined position of the container in the first opening is adapted by a device for adapting the geometry so that an electric field produced in the resonator chamber in a working mode is symmetrical in relation to the container or the impedance of the resonator unit equipped with container is approximately constant for containers of different configurations.

16 Claims, 5 Drawing Sheets

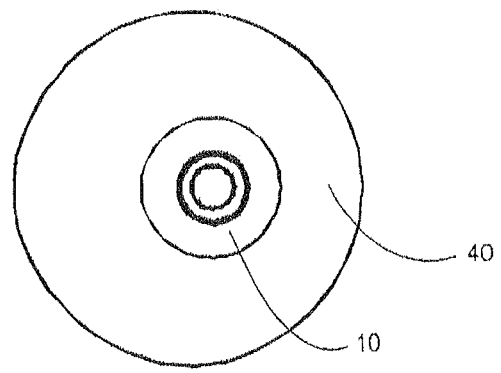
Fig. 5a
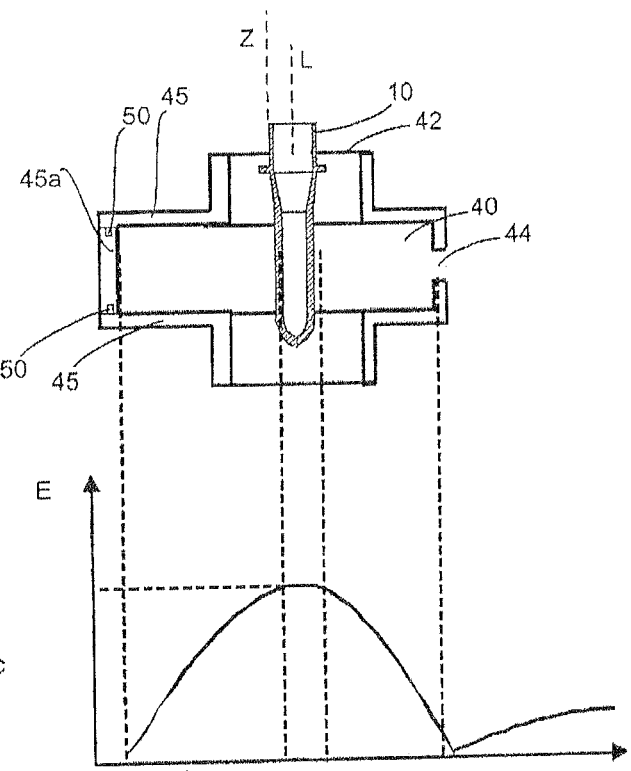
Fig. 5b
Fig. 5c

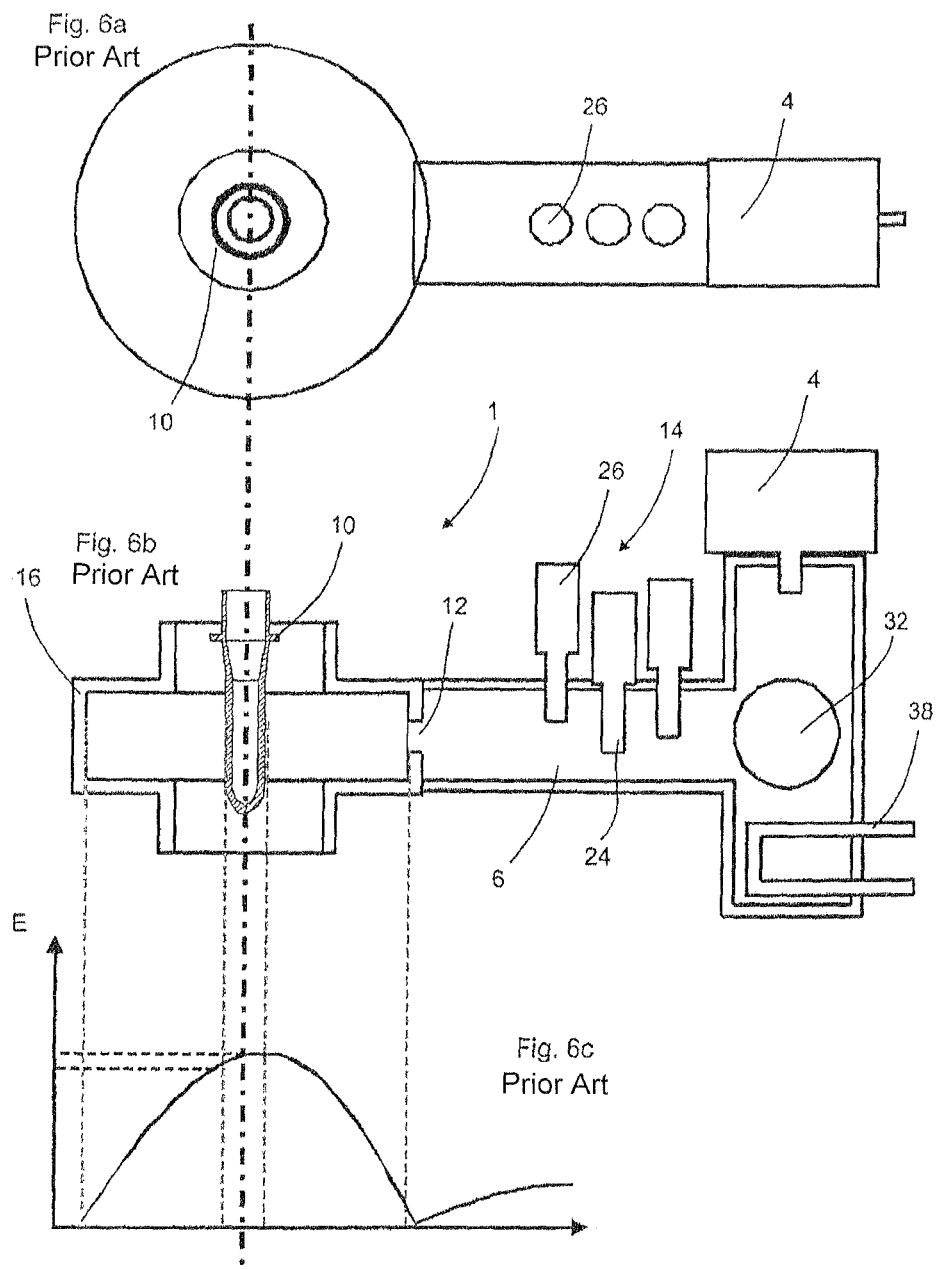

RESONATOR UNIT, EXPANSION PROCESS AND APPARATUS FOR HEATING CONTAINERS

BACKGROUND OF THE INVENTION

The invention relates to a resonator unit for an apparatus for heating containers, such as preforms for example, in particular plastic preforms, to an expansion process in which such a resonator unit is used, and to such an apparatus for heating containers.

In the beverage-producing industry, there is an increasing tendency to use, instead of glass bottles, other containers such as for example plastic containers and in particular containers made from PET (PET=polyethylene terephthalate) for beverages. During the production of these containers, firstly preforms are provided, these are heated and are supplied to an expansion process, for example a stretch-blowing process, in order in this way to obtain finished beverage containers. It is customary in the prior art to allow the preforms to run through a heating section, within which they are usually heated by means of infrared radiation.

In addition, however, it is also known in the prior art to use microwave radiation to heat preforms. An apparatus for this purpose is shown schematically in plan view in FIG. 6A and in cross-section in FIG. 6B. The apparatus 1 comprises a microwave generation device or magnetron 4, in which a heating device (not shown) can be integrated. The microwaves are generated in the magnetron 4 and are conducted into a circulator 32. From this circulator 32, the microwaves are introduced by means of a coupling-in device (not shown) into a conducting device 6 in the form of a hollow microwave conductor or hollow rectangular conductor. From there, the microwaves pass via a coupling-in region 12 into a resonator unit 16 and to the preforms 10 arranged within the resonator unit 16.

The temperature of the preforms 10 can be measured by means of a temperature sensor (not shown), such as a pyrometer for example, which is arranged on the resonator unit and in particular measures contactlessly the temperature of the preforms 10. The microwaves coming back from the preforms pass once again into the circulator 32 and from there into a water load 38. The water load 38 serves for damping the microwaves. The returning microwave energy can be measured by means of a sensor device (not shown), such as a diode for example. The measured values can be picked up by a control device (likewise not shown) and used for the power or energy tuning of the microwave power or energy. However, it is also possible to use for the power or energy tuning, in addition to or instead of the values measured by the sensor device, the values output by the temperature sensor for measuring the temperature of the preforms 10. In addition, the values measured by the temperature sensor could also be used to vary the heating phase of the preforms 10.

The power or energy tuning of the microwave power or energy reaching the preforms takes place by means of energy tuning units 14 which in each case consist of a drive device 26, for example in the form of a linear motor, and a regulating body or tuning pin 24. The regulating bodies or tuning pins 24 are arranged on the conducting device 6 in such a way that they can protrude into the conducting device 6 to varying lengths. The length of the regulating bodies or tuning pins 24 protruding into the conducting device 6 can if necessary be varied by the aforementioned control device during ongoing operation of the apparatus, i.e. while heating of the preforms 10 is taking place, in order thus to regulate the microwave energy applied to the preforms. In apparatuses 1 known from the prior art, usually at least three regulating bodies or tuning pins 24 are used to regulate the microwave power or energy.

Usually, the power applied to the preforms 10 is set prior to start-up of the apparatus 1 and then the apparatus 1 is operated with this set power. The energy tuning units 14 are usually impedance tuning units.

As a result, the preforms 10 for heating in the resonator unit 16 are exposed to an alternating electromagnetic field which excites dipoles within the material of the preforms 10, thereby leading to the heating of the preforms 10.

DE 10 2007 022 386 A1 discloses a heating apparatus for plastic preforms. Therein, the region of the plastic preforms that is to be heated is exposed to microwaves in a resonator for at least part of the temporal duration of the heating process.

DE 10 2006 015 475 A1 describes a process and an apparatus for controlling the temperature of preforms. In this process, cylindrical resonator units are used which have relatively high wall current losses in their structure.

FIG. 6A and FIG. 6B likewise show a cylindrical resonator unit 16 in which a preform 10 is introduced essentially into the centre of the resonator unit 16. If the opening for the preform 10 is in the centre of the resonator unit and if the preform 10 is heated by microwaves in the resonator unit 16, the field distribution of the electromagnetic field that forms in the preform 10 is asymmetrical, as shown in FIG. 6C. This also results in an asymmetrical heating of the preform 10. This means that the side of the preform which is assigned to the coupling-in region 12 is heated to a greater extent. Such a heating leads to an asymmetrical or non-uniformly shaped finished beverage container, which is in some cases unfavourable.

In order to solve this problem, it has been proposed to allow the preform to rotate about its axis, in order in this way to achieve a symmetrical heating of the preform. However, it has been found that even such a rotation of the preform cannot always lead to a sufficiently symmetrical heating of the preform.

Moreover, different resonator units have until now had to be used for preforms having different geometries and wall thicknesses. This causes a complicated and cost-intensive provision of a plurality of different resonator units and a likewise complicated and cost-intensive changeover of the entire resonator units depending on the preforms used in each case. Since the production plants customary at present for such containers comprise a large number of resonator units, for example 40 to 50 items, such a provision and changeover of the resonator units is highly disadvantageous.

SUMMARY OF THE INVENTION

The object of the present invention is to provide a resonator unit for an apparatus for heating containers, an expansion process in which such a resonator unit is used, and such an apparatus for heating containers, which solve the abovementioned problems of the prior art and ensure a symmetrical temperature distribution in the container and a temperature distribution that can be adapted to different containers during the heating thereof in an expansion process.

This object is achieved by a resonator unit which comprises a resonator chamber which has a first opening for receiving a container in a predefined position and serves for heating the container by means of microwaves coupled into the resonator chamber. The geometry of the resonator chamber is adapted or varied by a device or a configuration, in particular a configuration of the resonator chamber, for adapting or varying the geometry of the resonator chamber relative to the predefined position of the container in the first opening so that an electric field produced in the resonator chamber in a working mode—in particular in a region around the container—is symmetrical in relation to the container or the impedance of the resonator unit equipped with a container is approximately constant for containers of different configurations.

Hereinafter, for the sake of simplicity, mention will be made only of a device for adapting, but it is pointed out that this term may likewise relate to a configuration for adapting or varying the geometry of the resonator chamber. Preferably, the electric field in a range of at least a few mm, preferably at least 2 cm, in the radial direction around the container or an outer wall of the container is symmetrical in relation to the container.

The device for adapting or varying the geometry of the resonator chamber preferably depends on the configuration of the container to be introduced into the resonator chamber. The two proposed procedures, in which on the one hand a symmetrical distribution of the electric field and on the other hand a constant impedance is created for different containers, can be used as alternatives or also in addition to one another. In both cases, an adaptation of the resonator chamber, in particular also relative to the containers, is proposed in order to improve the heating process. Both the symmetrical field distribution and the constant impedance improve the heating process.

However, it is pointed out that an adaptation of the geometry of the resonator chamber does not necessarily require also a variation (or changeover) of the geometry of the resonator chamber. An adaptation of this geometry can take place by means of several different measures, for example in that the resonator chamber itself is adapted, for example by adapting the positions of walls of the resonator chamber. In addition, the position of the container inside the resonator chamber can also be varied or adapted. In addition, additional materials can also be introduced into the resonator chamber, as a result of which the geometry of the resonator chamber, particularly with regard to the field distribution of the microwaves in the interior thereof, is adapted by this introduction.

Preferably, the resonator chamber is adapted in the radial surroundings of the container and in particular also in a region along the longitudinal direction of the container which lies between a first boundary edge of the container and a second boundary edge of the container. The heating devices known from the prior art which operate on the basis of microwaves do not describe any modifications of the resonator chamber. It should be taken into account here that such microwave ovens are also not comparable with those microwave ovens which are used domestically for example, since the power necessary for heating the plastic preforms is much higher than the power used for heating beverages for example.

Preferably, the containers can be configured differently by means of the material and/or geometry thereof.

The device for adapting or varying the geometry of the resonator chamber may be a compensating dielectric which is arranged in the resonator chamber. In this case, the compensating dielectric may be a ring or else it may be a pin which protrudes into the resonator chamber. The compensating dielectric may be made from polytetrafluoroethylene or polypropylene. In general, the compensating dielectric may consist of a material with a low loss factor.

Moreover, the device for varying the geometry of the resonator chamber may be at least one metal pin which protrudes into the resonator chamber.

Preferably, the dielectric pin and/or the at least one metal tuning pin protrude into the resonator chamber to varying lengths.

In addition, it is possible that the device for adapting or varying the geometry of the resonator chamber is a second opening via which the microwaves are coupled into the resonator chamber. The second opening may be a variable diaphragm or an exchangeable diaphragm. Since the resonant frequency and quality of the resonator are also critically linked to the size of said opening or diaphragm, the resonator may in certain cases also be varied by a variation of this diaphragm geometry.

Preferably, the device for adapting or varying the geometry of the resonator chamber brings about the situation whereby the resonator chamber has an eccentric geometry relative to the predefined position of the preform or to a longitudinal direction of the preform in the first opening. In addition, the resonator unit may have an eccentric geometry relative to the predefined position of the preform in the first opening. In this case, it is also possible that the degree of this eccentricity is variable.

In this case, preferably the resonator unit itself as a result of the eccentricity is the aforementioned device for adapting or varying the geometry of the resonator chamber, i.e. in this embodiment the resonator does not require any additional elements such as dielectrics. This means that the device or configuration need not necessarily be an additional device of the resonator unit but rather the device may be the eccentrically configured resonator chamber.

The resonator unit is preferably cylindrical and the predefined position of the preform or of the longitudinal axis thereof in the first opening is eccentric to the centre of the cylindrical resonator unit.

The aforementioned object is furthermore achieved by an expansion process in which a finished container is produced by expanding a preform of the container which is heated by means of microwaves in the resonator unit, which is designed as described above. Preferably, the expansion process also comprises the stretching of the container and/or a blow-moulding of the preform to form a container.

The aforementioned object is furthermore achieved by an apparatus which comprises: at least one microwave generation unit for generating an alternating electromagnetic field in the form of microwaves, a conducting device for transmitting the microwaves generated by the microwave generation unit to a resonator unit, and a transport device for transporting the containers into the resonator unit. The resonator unit here is designed as described above.

By means of the above-described resonator unit for an apparatus for heating containers, the expansion process and such an apparatus for heating containers, it is possible to achieve a symmetrical temperature distribution in a preform during the heating thereof in an expansion process to produce a container. Moreover, the modification of the resonator units when changing the type of containers in the resonator units is greatly simplified.

BRIEF DESCRIPTION OF THE DRAWINGS

The invention will be described in more detail below with reference to the appended drawing, in which:

FIG. 5A shows a schematic plan view of a resonator unit according to a second example of embodiment of the present invention;

FIG. 5B shows a schematic cross-section through a resonator unit according to the second example of embodiment of the present invention;

FIG. 5C shows a schematic diagram of the field distribution of the electromagnetic field in the resonator unit shown in FIG. 5B during operation;

FIG. 6A shows a schematic plan view of an apparatus for heating containers according to the prior art;

FIG. 6B shows a schematic cross-section through an apparatus for heating containers according to the prior art;

FIG. 6C shows a schematic diagram of the field distribution of the electromagnetic field in the resonator unit shown in FIG. 6B during operation.

DETAILED DESCRIPTION OF THE INVENTION

First Example of Embodiment

In the following description, the same references as in FIG. 6A to FIG. 6C are used for the same parts.

Figure 1:
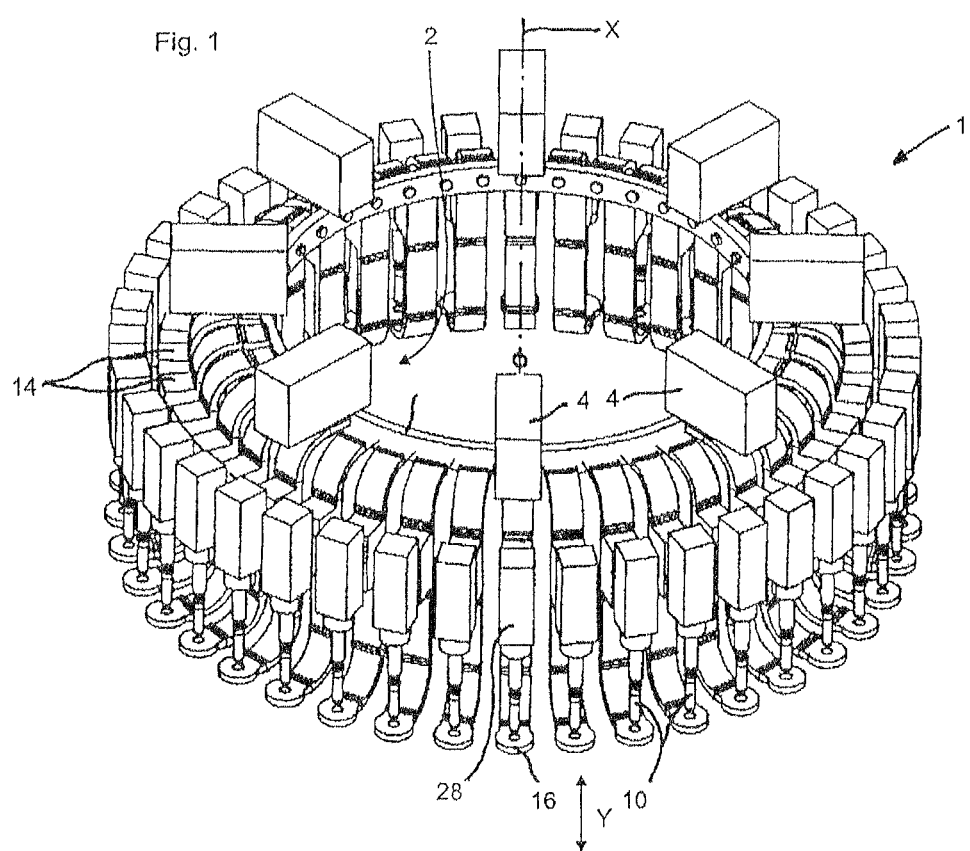
FIG. 1 shows a schematic diagram of an apparatus for heating containers.

FIG. 1 shows an apparatus 1 for heating containers 10 or preforms 10 for containers. The function of the apparatus 1 will be described below using the example of preforms 10, although the device 1 can also be used for heating already finished containers 10.

As shown in FIG. 1, the apparatus 1 comprises a plurality of microwave generation devices 4, for example a magnetron. The microwaves generated by the microwave generation devices 4 pass via conducting devices to resonator units 16 and from these into preforms 10. The preforms 10 are heated by means of the energy of the microwaves, as described above, and are shaped for example by an expansion process into finished containers for beverages for example.

Reference 2 in FIG. 1 denotes a transport device which causes the individual containers or preforms 10 to be rotated about an axis of rotation X. Reference 14 denotes in their entirety energy tuning units which serve for regulating the energies applied to the preforms 10, as described in connection with the prior art with reference to FIG. 6A to FIG. 6C. By means of drive units 28, the position of the preforms 10 relative to the resonator units 16 can be shifted in the direction Y which runs parallel to the axis of rotation X.

Moreover, the apparatus 1, with the exception of the resonator unit 16, is constructed in the same way as the apparatus of the prior art which is illustrated in FIG. 6A to FIG. 6C.

Figure 2:
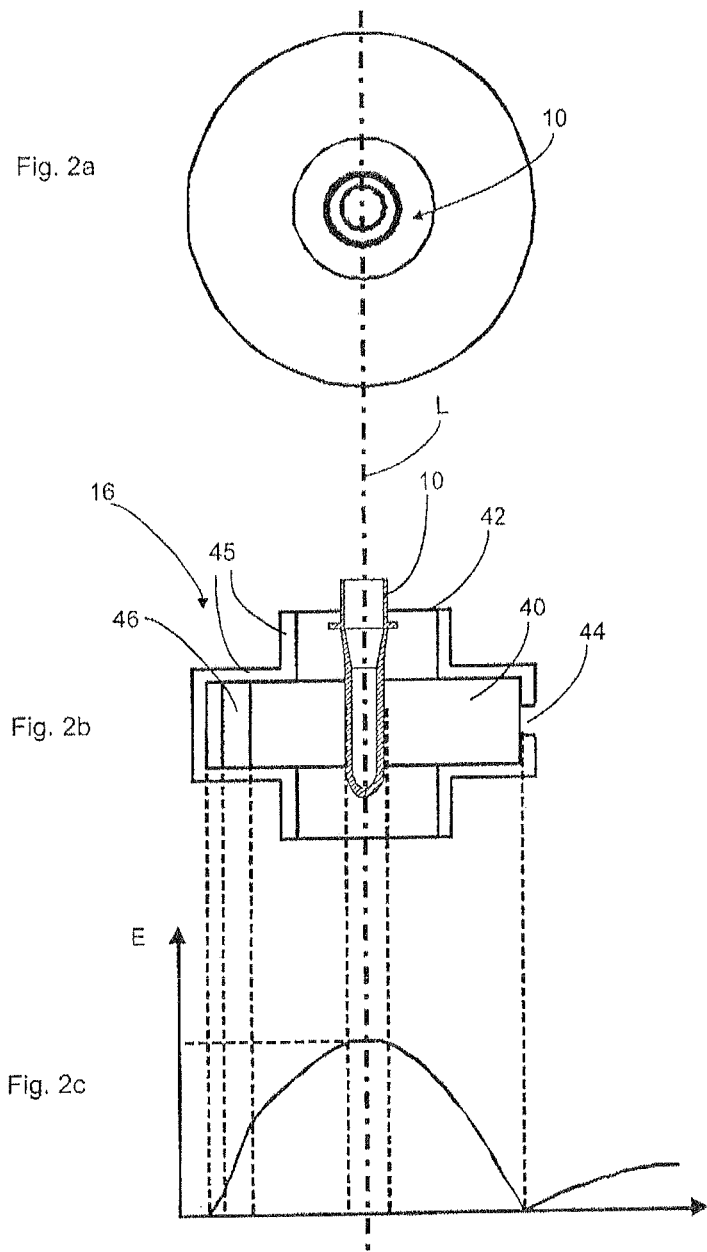
FIG. 2A shows a schematic plan view of a resonator unit according to a first example of embodiment of the present invention.
FIG. 2B shows a schematic cross-section through the resonator unit according to the first example of embodiment of the present invention.
FIG. 2C shows a schematic diagram of the field distribution of the electromagnetic field in the resonator unit shown in FIG. 2B during operation.

The resonator unit 16 according to the first example of embodiment of the invention is shown in plan view in FIG. 2A and in cross-section in FIG. 2B. As shown in FIG. 2B, the resonator unit 16 comprises a resonator chamber 40 with a first opening 42 via which a container or preform 10 can be introduced into the resonator chamber 40, in particular by moving the preform along its longitudinal direction L. The preform 10 is arranged in a predefined position in the first opening 42. However, it would also be possible that the position of the preform within the resonator chamber varies during the heating process. For instance, the preform could be moved along its longitudinal axis and/or rotated about this longitudinal axis during the heating process.

The first opening 42 has a smaller diameter than the resonator chamber 40. Moreover, the resonator chamber has a second opening 44 which can be connected to the conducting device 6, as shown in FIG. 6B. The second opening 44 may be designed as a diaphragm. The resonator chamber 40 is equivalent to the microwave active region of the resonator unit 16, that is to say the region in which a preform 10 received in the resonator unit 16 or the resonator chamber can be heated by microwaves. As shown in FIG. 2B, the resonator chamber 40 need not be completely closed by walls 45. However, it would also be possible that an opening cross-section of the second opening 44 is variable or a diaphragm which forms the second opening is exchangeable. Furthermore, it would also be possible that a further diaphragm having a variable cross-section is arranged in front of the second opening 44. This further diaphragm could in this case be provided within the hollow conductor (cf. FIG. 6b). Furthermore, a suitable diaphragm could also be arranged within the resonator chamber 40.

As also shown in FIG. 2B, a compensating dielectric 46 is provided in the part of the resonator unit 16 remote from the second opening 44. The material of the compensating dielectric 46 may be made from a polymer, such as for example polytetrafluoroethylene (PTFE), or a polyolefin, such as for example polypropylene (PP). Such a material has a low loss factor, as a result of which the compensating dielectric 46 is not heated or is heated only slightly when exposed to microwaves. In the compensating dielectric 46, the wavelength of the microwaves is shorter than in the resonator chamber 40 filled with ambient air, so that the resonator chamber 40 is more active in the part of the resonator unit 16 in which the compensating dielectric 46 is located.

The compensating dielectric 46 brings about the situation whereby the impedance of the resonator unit 16 equipped with a preform 10 is kept approximately constant when using preforms 10 with different geometries and wall thicknesses. This means that the compensating dielectric 46 is a device for varying the geometry of the resonator chamber 40. In particular, in this way, the same resonator unit 16 can be used if the compensating dielectric 46 is introduced into the resonator unit 16 when changing from a thick-walled to a thin-walled preform 10. As can be seen from FIG. 2A and FIG. 2B, in this way the preform 10 can also be received centrally in the second opening 44.

Figure 3:
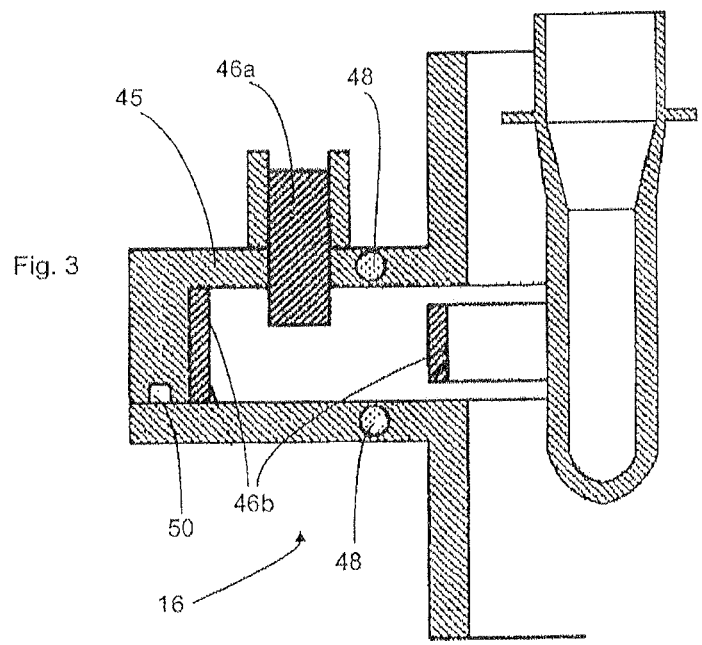
FIG. 3 shows a schematic partial cross-section through a resonator unit according to the first example of embodiment of the present invention.

FIG. 3 shows an enlarged cross-section through the part of the resonator unit 16 remote from the second opening 44. The resonator unit 16 has in its wall 45 a compensating dielectric 46 which is configured as a pin 46b. Moreover, the resonator unit 16 has two compensating dielectrics 46 which are configured as a ring 46b. The ring 46b may be for example an insertion ring which is placed or fixed in the resonator chamber 40 at the wall 45, or the ring 46b may be fixed to a holding device inside the resonator chamber in such a way that it is located in the part of the resonator unit 16 remote from the second opening 44 when the preform is inserted in the resonator unit 16, as shown in FIG. 3. However, it would also be possible that the ring 46b is configured as a ring which surrounds the container 10. The compensating dielectrics 46a, 46b may be provided both as alternatives and together.

Provided in the wall 45 of the resonator unit 16 in FIG. 3 is a coolant bore 48 through which a coolant for cooling the resonator unit 16 can flow.

It can also be seen from FIG. 3 that the resonator unit 16 may be composed of two parts. A groove 50 is provided in one of the parts of the resonator unit 16, in the upper part in FIG. 3. By virtue of this groove 50, the contact pressure between the two parts of the resonator unit 16 can be increased, since the groove 50 reduces the bearing surface area of a screw connection of the two parts of the resonator unit 16. In this way, the resistance in the walls of the resonator unit 16 is reduced.

In one embodiment of the resonator unit 16, as described above, the symmetrical field distribution of the electromagnetic field E shown in FIG. 2C can be achieved in the resonator chamber 40. As a result of this, a symmetrical temperature distribution in a preform 10 is also achieved when said preform is inserted into the above-described resonator unit 16 and the latter is used in an expansion process in which a finished container for beverages for example is produced from the preform 10. However, it would also be possible to use dielectrics in a targeted manner in order to achieve an asymmetrical field distribution and thus a targeted asymmetrical heating of the preform. This might be of interest for example if containers with a cross-section differing from a circular cross-section are to be produced.

Figure 4:
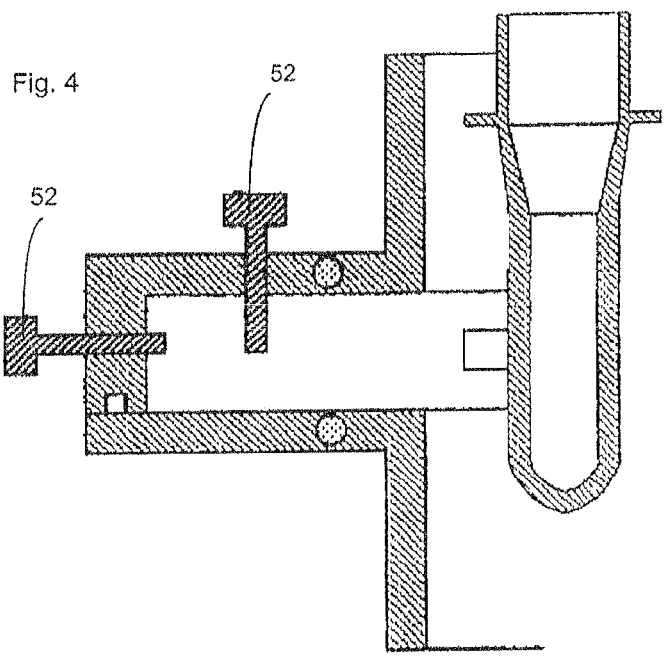
FIG. 4 shows a schematic partial cross-section through a resonator unit according to a first modification of the first example of embodiment of the present invention.

In a first modification of the first example of embodiment, the resonator unit 16 comprises one or more metal pins 52 which protrude into the resonator chamber 40. By way of non-limiting example, two metal pins 52 are shown in FIG. 4. In this case, the metal pin(s) are the device for varying the geometry of the resonator chamber. All or even just some of the metal pins 52 may be configured as tuning screws and may be provided instead of or in addition to the compensating dielectric 46 in the resonator unit 16. When changing over to a different type or configuration of the preform 10, the pins 52 are if necessary arranged in such a way that they protrude into the resonator chamber 40 to the required length. Also in this way, the impedance of the resonator unit 16 can be kept approximately constant, even if the resonator unit 16 is equipped with containers of different configurations, as described above. These metal pins therefore represent dielectric "tuning pins" which are provided within the resonator chamber and which can penetrate to varying degrees into the resonator chamber.

In a second modification of the first example of embodiment, the resonator unit 16 may also have a variable diaphragm or an exchangeable diaphragm instead of or in addition to the compensating dielectric 46 or the one or more metal or dielectric tuning pins 52. This means that the geometry of the resonator unit 16 or of the resonator chamber 40 is varied by varying the diaphragm geometry when changing the preform 10. As a result, the resonant frequency and quality of the resonator unit 16 can be varied via the size of the diaphragm. Also in this way, the impedance of the resonator unit 16 can be kept approximately constant, even if the resonator unit 16 is equipped with containers of different configurations, as described above. In this case, the diaphragm is the device for varying the geometry of the resonator chamber.

Second Example of Embodiment

The second example of embodiment of the present invention, which is shown in FIG. 5A to FIG. 5C, is identical to the first example of embodiment apart from the differences with respect to the first example of embodiment which are described below.

As shown in FIG. 5A and FIG. 5B, the first opening 42 is arranged not in the centre of the cylindrical resonator unit 16 but rather eccentrically relative to the centre of the cylindrical resonator unit 16. The container 10 or the longitudinal axis L thereof is thus also not symmetrical but rather eccentric to the centre (line Z) of the resonator chamber.

This can be brought about on the one hand by producing a resonator unit 16 which has a fixed eccentric geometry relative to the predefined position of the preform 10 in the first opening 42, as shown by way of example in plan view in FIG. 5A and in cross-section in FIG. 5B. In this case, the arrangement of the first opening 42 is the device for adapting the geometry of the resonator chamber 40.

Moreover, the first opening 42 can be shifted relative to the walls 45 of the resonator chamber 40 by means of a further diaphragm, so that the resonator unit 16 likewise has a fixed eccentric geometry relative to the predefined position of the preform 10 in the first opening 42, as shown by way of example in plan view in FIG. 5A and in cross-section in FIG. 5B. In this case, the arrangement of the first opening 42 or the diaphragm is likewise the device for adapting or varying the geometry of the resonator chamber 40.

The configuration of the resonator unit 16 shown in FIG. 5A and FIG. 5B can also be brought about in that the resonator unit 16 has a variable wall 45a which is arranged vertically and between the horizontal walls 45 in FIG. 5B. The variable wall 45a must be provided with a respective groove 50 on each of its two end faces adjoining the walls 45, as shown for just one end face of the wall in FIG. 3. By virtue of this groove 50, the contact pressure between the variable wall 45a and the two horizontal walls 45 can be increased, since the groove 50 reduces the bearing surface area of a screw connection of the parts of the resonator unit 16. In this way, the resistance in the walls of the resonator unit 16 is reduced. The variable wall 45a serves as the device for adapting or varying the geometry of the resonator chamber.

As shown in FIG. 5A and FIG. 5B, the resonator unit 16 has an eccentric geometry relative to the predefined position of the preform 10 in the first opening 42. In other words, in FIG. 5A and FIG. 5B, the resonator unit 16 is cylindrical and the predefined position of the preform 10 in the first opening 42 is eccentric to the centre of the cylindrical resonator unit 16.

Also in this way, the impedance of the resonator unit 16 can be kept approximately constant, even if the resonator unit 16 is equipped with containers of different configurations, as described above. The symmetrical field distribution shown in FIG. 5c can therefore also be achieved in this way.

Third Example of Embodiment

In order to achieve a symmetrical temperature distribution in a preform 10 during the heating thereof in an expansion process to produce a container, the preform 10 can also be arranged eccentric to the centre of the resonator chamber 40.

Fourth Example of Embodiment

Instead of a cylindrical configuration of the resonator unit 16, the resonator unit 16 may also have an elliptical shape. A symmetrical temperature distribution in the preform 10 during the heating thereof in an expansion process to produce a container can also be achieved as a result.

The resonator units 16 described in the example of embodiment of the present invention can be used in an apparatus 1 for heating containers according to the prior art, as shown in FIG. 6A to FIG. 6C and as described in the introductory part of the description. As can be seen from the above description of the examples of embodiments of the present invention, no adaptation or only a very slight adaptation of the apparatus 1 itself is necessary when the resonator units 16 according to the invention are used thereon.

Unlike the apparatus 1 shown in FIG. 6A to FIG. 6C, in which at least three regulating bodies or tuning pins 24 are used to regulate the microwave power or energy, in the apparatus according to the invention it is also sufficient to use just two regulating bodies or tuning pins 24.

The resonator units 16 according to the invention can be used in an expansion process in which a finished container is produced by expanding a preform 10 of the finished container which is heated by means of microwaves in a resonator unit. The expansion may take place by stretching the preform 10 and blowing into the preform 10.

The above-described embodiments of the resonator unit, of the apparatus for heating preforms for containers and of the expansion process can be used both individually and in all possible combinations of the aforementioned individual embodiments.

All of the features disclosed in the application documents are claimed as essential to the invention in so far as they are novel individually or in combination with respect to the prior art.

LIST OF REFERENCES 1 apparatus
2 transport device
4 microwave generation device
6 conducting device
10 container, preform
12 coupling-in region
14 energy tuning unit
16 resonator unit
24 tuning pins
26 drive unit
32 circulator
38 water load
40 resonator chamber
42 first opening
44 second opening, diaphragm
45 wall
45a wall
46 compensating dielectric
46a pin
46b ring
48 coolant bore
50 groove
52 tuning pin
X axis of rotation
Y direction
E electric field

The invention claimed is:

1. A resonator unit including a resonator chamber for heating a container or a container preform of different geometric configurations, wherein said resonator chamber has a first opening through which a container or a container preform may be introduced into the resonator chamber in a predefined position in the resonator chamber for heating the container or container preform using microwaves coupled through a second opening into the resonator chamber and a compensating means for adapting a geometry of the resonator chamber to adjust an impedance of the resonator chamber relative to the predefined position of the container or container preform when positioned in the resonator chamber so that an electric field produced in the resonator chamber in a working mode is symmetrical in relation to the container or container preform when in the resonator chamber, or the impedance of the resonator unit is approximately constant for the container or container preform when in the resonator chamber.

2. The resonator unit according to claim 1, wherein the compensating unit is a compensating dielectric which is arranged in the resonator chamber.

3. The resonator unit according to claim 2, wherein the compensating dielectric is a ring.

4. The resonator unit according to claim 2, wherein the compensating dielectric is a dielectric pin which protrudes a distance into the resonator chamber.

5. The resonator unit according to claim 2, wherein the compensating dielectric is made from polytetrafluoroethylene or polypropylene.

6. The resonator unit according to claim 1, wherein the compensating unit is at least one metal pin which protrudes a distance into the resonator chamber.

7. The resonator unit according to claim 4, wherein the distance the dielectric pin protrudes into the resonator chamber is adjustable.

8. The resonator unit according to claim 1, wherein the second opening is a variable diaphragm or an interchangeable diaphragm.

9. The resonator unit according to claim 1, wherein the compensating means creates an eccentric electromagnetic field distribution in the resonator chamber.

10. The resonator unit according to claim 9, wherein the resonator unit has an eccentric geometry relative to the container or container preform when positioned in the resonator chamber.

11. The resonator unit according to claim 1, wherein the resonator unit is cylindrical and the predefined position of the container or container preform is eccentric to a centre of the cylindrical resonator unit.

12. A process, in which a container is produced by expanding a preform by heating using microwave energy in a resonator unit, wherein the resonator unit comprises
a resonator chamber which has a first opening for receiving a preform in a predefined position in the resonator chamber and which serves for heating the container preform using microwave energy coupled into the resonator chamber, and
a compensating means for adapting a geometry of the resonator chamber relative to the predefined position in the resonator chamber so that an electric field produced in the resonator chamber in a working mode is symmetrical in relation to the container or the impedance of the resonator unit equipped with a container is approximately constant for containers of different geometrical configurations.

13. An apparatus for heating containers, which comprises at least one resonator unit as claimed in claim 1, including a microwave generation unit for generating an alternating electromagnetic field in the form of microwaves, a conducting device for transmitting the microwaves generated by the microwave generation unit to the resonator unit, and a transport device for transporting the containers into the resonator unit.

14. The resonator unit according to claim 3, wherein the compensating dielectric is made from polytetrafluoroethylene or polypropylene.

15. The resonator unit according to claim 4, wherein the compensating dielectric is made from polytetrafluoroethylene or polypropylene.

16. The resonator unit according to claim 6, wherein the distance the at least one metal pin protrudes into the resonator chamber is adjustable.

* * * * *

UNITED STATES PATENT AND TRADEMARK OFFICE
CERTIFICATE OF CORRECTION

| | | |
|---|---|---|
| PATENT NO. | : 8,664,574 B2 | Page 1 of 1 |
| APPLICATION NO. | : 12/686858 | |
| DATED | : March 4, 2014 | |
| INVENTOR(S) | : Senn et al. | |

It is certified that error appears in the above-identified patent and that said Letters Patent is hereby corrected as shown below:

On the Title Page

Item (57), Abstract, line 2, "receiving container" should be --receiving a container--.

Item (57), Abstract, line 11, "with container" should be --with a container--.

Signed and Sealed this
Twenty-sixth Day of August, 2014

Michelle K. Lee
*Deputy Director of the United States Patent and Trademark Office*